US012624999B2

(12) United States Patent
Skriba et al.

(10) Patent No.: US 12,624,999 B2
(45) Date of Patent: May 12, 2026

(54) FLOWCELL AND SYSTEM WITH IMPROVED COLLECTION EFFICIENCY FOR RAMAN SPECTROSCOPY

(71) Applicant: Endress+Hauser Optical Analysis, Inc., Ann Arbor, MI (US)

(72) Inventors: Nicholas Skriba, Jackson, MI (US); James Tedesco, Livonia, MI (US); Joseph Slater, Dexter, MI (US)

(73) Assignee: Endress+Hauser Optical Analysis, Inc., Ann Arbor, MI (US)

( * ) Notice: Subject to any disclaimer, the term of this patent is extended or adjusted under 35 U.S.C. 154(b) by 198 days.

(21) Appl. No.: 18/053,246

(22) Filed: Nov. 7, 2022

(65) Prior Publication Data

US 2024/0151584 A1 May 9, 2024

(51) Int. Cl.
| | |
|---|---|
| *G01J 3/44* | (2006.01) |
| *G01N 21/03* | (2006.01) |
| *G01N 21/05* | (2006.01) |
| *G01N 21/65* | (2006.01) |

(52) U.S. Cl.
CPC .............. *G01J 3/4412* (2013.01); *G01J 3/44* (2013.01); *G01N 21/031* (2013.01); *G01N 21/05* (2013.01); *G01N 21/65* (2013.01); *G01N 2021/0346* (2013.01)

(58) Field of Classification Search
CPC .......... G01J 3/44; G01J 3/4412; G01N 21/65; G01N 21/0303; G01N 21/031; G01N 21/05; G01N 2021/0346; G01N 2021/0389
See application file for complete search history.

(56) References Cited

U.S. PATENT DOCUMENTS

| | | | | | |
|---|---|---|---|---|---|
| 2,779,230 | A | * | 1/1957 | White | G01N 21/65 |
| | | | | | 359/730 |
| 3,849,654 | A | * | 11/1974 | Malvin | G01N 21/05 |
| | | | | | 250/361 R |
| 4,345,837 | A | * | 8/1982 | Kallet | G01N 21/64 |
| | | | | | 356/244 |

(Continued)

FOREIGN PATENT DOCUMENTS

| | | |
|---|---|---|
| EP | 3647769 A1 | 5/2020 |
| JP | 2009063462 A | 3/2009 |

*Primary Examiner* — Kara E. Geisel
*Assistant Examiner* — Jonathon Cook
(74) *Attorney, Agent, or Firm* — Gil M. Repa; Endress+Hauser (USA) Holding, Inc.

(57) ABSTRACT

Flowcells and Raman analysis systems provide improved signal collection dynamics through increased solid-angle geometries and improved numerical aperture for near-diffraction-limited performance. A combined excitation/collection beam passes through a first optical material, a sample conduit and a second optical material. A concave reflective aspheric surface focuses and re-collimates the combined beam to and from a region of the sample within the conduit. The optical materials may comprise separate windows or may integrally form sidewalls the conduit. The reflective surface may be spaced apart from the second window or may be integrally formed with the second optical material. The focused region in the sample may approximate a point or a line, and at least a portion of the interior wall of the conduit may be reflective, causing the combined beam to pass through the sample region more than once to enhance collection efficiency.

22 Claims, 6 Drawing Sheets

(56) References Cited

U.S. PATENT DOCUMENTS

| | | | | |
|---|---|---|---|---|
| 4,953,976 | A * | 9/1990 | Adler-Golden | G01N 21/65 |
| | | | | 356/301 |
| 5,445,964 | A * | 8/1995 | Lee | G01N 33/2882 |
| | | | | 436/171 |
| 5,615,043 | A * | 3/1997 | Plaessmann | H01S 3/2325 |
| | | | | 359/347 |
| 5,754,288 | A * | 5/1998 | Yamamoto | G01N 21/65 |
| | | | | 356/301 |
| 5,780,857 | A * | 7/1998 | Harju | G01N 27/44721 |
| | | | | 250/458.1 |
| 6,795,177 | B2 * | 9/2004 | Doyle | G01J 3/44 |
| | | | | 356/301 |
| 7,251,026 | B2 * | 7/2007 | Gilby | G01J 3/02 |
| | | | | 356/246 |
| 7,692,786 | B2 * | 4/2010 | Tedesco | G01J 3/02 |
| | | | | 356/301 |
| 8,824,042 | B2 * | 9/2014 | Tedesco | H01S 3/305 |
| | | | | 359/334 |
| 10,352,865 | B1 * | 7/2019 | Yelvington | G01N 21/85 |
| 10,670,528 | B2 * | 6/2020 | Slater | G01J 3/0208 |
| 11,953,423 | B1 * | 4/2024 | Gass | G01N 21/031 |
| 11,959,859 | B2 * | 4/2024 | Carlen | G01J 3/44 |
| 2005/0084980 | A1 * | 4/2005 | Koo | G01J 3/44 |
| | | | | 436/171 |
| 2006/0160209 | A1 * | 7/2006 | Larson | G01N 21/05 |
| | | | | 356/300 |
| 2010/0136709 | A1 * | 6/2010 | Ruckstuhl | G01N 21/6458 |
| | | | | 436/164 |
| 2010/0201977 | A1 * | 8/2010 | Milosevic | G01J 3/42 |
| | | | | 356/301 |
| 2018/0246031 | A1 | 8/2018 | Proskurowski et al. | |
| 2019/0391069 | A1 * | 12/2019 | Shimizu | G01N 21/41 |
| 2020/0141870 | A1 * | 5/2020 | Slater | G01J 3/0218 |
| 2020/0261939 | A1 * | 8/2020 | Fontana | B05B 9/0403 |
| 2023/0125832 | A1 * | 4/2023 | Lancuba | G01N 21/031 |
| | | | | 356/437 |

* cited by examiner

FLOWCELL AND SYSTEM WITH IMPROVED COLLECTION EFFICIENCY FOR RAMAN SPECTROSCOPY

TECHNICAL FIELD

The present disclosure relates generally to spectroscopy and, in particular, to Raman spectroscopy and, more particularly, to flowcells and Raman spectroscopic systems with improved collection efficiency.

BACKGROUND

Induced radiation effects such as Raman scattering and fluorescence have become extremely valuable tools associated with the non-destructive determination of molecular composition of materials and media. However, Raman scattering is a notoriously weak effect, requiring advanced techniques to ensure adequate signal for quantitative analysis of the molecular compositions.

A conventional Raman system includes three main components: a laser excitation source, sampling optics and a spectrometer. Because Raman instruments use lasers in the visible and near-infrared regions, optical fibers can be used to transmit radiation from the laser excitation source to a sample and to collect resulting scattered radiation from the sample. In process control and other applications, a Raman probe can be inserted into a chemical reaction process to collect the scattered radiation directly, or the Raman probe can collect the scattered radiation, including Raman spectra within the scattered radiation, though a window, for example, via an external reaction sample loop or flowcell, thereby avoiding potential sample contamination.

FIG. 1 shows a schematic diagram of a conventional, fiber-based Raman probe 100. Excitation radiation (e.g., light) from a laser is transmitted into the probe over an optical fiber 102, which radiation is then collimated by a lens 104. The collimated light may then pass through a bandpass filter 108 to remove wavelengths within the collimated light that are not at the laser's wavelength, generally noise resulting from the fiber 102 and optics, such as the lens 104. The filtered light may be reflected by a mirror 106 onto a beam combiner 120, which may then be directed to a sample along a counter-propagating collimated path 122. Light scattered by the sample under investigation returns along path 122 (e.g., a collection signal), passes through beam combiner 120 and may be filtered by an optional notch filter 116 to remove Rayleigh-scattered light at the laser frequency and under interference before being focused by a lens 114 onto the end of a collection fiber 112, which may be connected to a spectrometer of the Raman system.

FIG. 2 shows a simplified block diagram of a conventional flowcell arrangement 200 for Raman spectroscopy. The laser excitation source is represented by block 202, and the spectrometer with block 204. A processor 208 (e.g., computer) may be included to control system operation, to enable a user interface and to receive and analyze Raman signals (e.g., Raman spectra) separated by the spectrometer of the Raman system. Block 206 represents beam-combining optics to generate a collimated, counter-propagating, combined excitation/collection beam 210. For example, block 206 may include a fiber-coupled probe like the probe 100 of FIG. 1.

In FIG. 2, the combined beam 210 is focused by an objective lens 212 to a point 214 within a conduit 216 (e.g., a flow tube), which may contain a medium 222 under investigation (e.g., a liquid). The conduit 216 may be a primary flow tube, process vessel or a capillary branch from a primary tube or vessel. Notably, the lens 212 is air-spaced from the conduit 216 such that the combined beam 210 travels from the lens 212, through free space (not necessarily a vacuum) and into the conduit 216. Conventional objective lenses for flowcells, such as the lens 212, have a numerical aperture (NA) of about 0.3, yielding a solid angle of cone 218 is approximately 0.29 Sr. Additional losses of aperture occur due to an index mismatch from lens-air-medium interfaces, resulting in a solid angle within the sample of approximately 0.16 Sr, for example (n=1.333 for pure water).

A reflector 220 may be provided to achieve a 'multi-pass' configuration in which the excitation radiation of the beam 210 passes back through the conduit 216 toward the optics 206. While this arrangement generates additional signal through relayed imaging, this arrangement still does not increase the solid angle. Thus, 0.3 NA objective lenses can only 'see' 4.6% of the total hemisphere in air, 2.5% in water. As such, a need remains for improved optical geometries to maximize signal-generation capabilities in flow-cell configurations for Raman spectroscopy.

SUMMARY

In one aspect of the present disclosure, a flowcell for spectroscopy for use with a collimated optical beam combining a laser excitation beam and a signal collection beam into a combined beam comprises: a flow channel configured to convey a sample, wherein the flow channel has opposing first and second sides; first and second optical materials disposed on the first and second sides of the flow channel, respectively; and a concave aspheric reflective surface disposed adjacent the second side, wherein the collimated beam is configured relative to the flowcell to pass through the first optical material, the flow channel and the second optical material, and then impinge upon the concave aspheric reflective surface, wherein the concave aspheric reflective surface is operative to focus the excitation beam of the combined beam to a region within the sample within the flow channel and to re-collimate the signal collection beam into the combined beam from the region within the sample, and wherein the signal collection beam includes Raman scattered radiation.

In at least one embodiment, the concave aspheric reflective surface is a parabolic, biconic or freeform optical surface. In a further embodiment, the first and second optical materials each comprise separate windows disposed on the opposing first and second sides of the flow channel. Alternatively, the first and second optical materials form the opposing first and second sides of the flow channel, respectively.

In at least one embodiment, the first and second optical materials comprise separate first and second windows disposed on the opposing first and second sides, respectively, of the flow channel, and the concave aspheric reflective surface is spaced apart from the second window. In a further embodiment, the first and second optical materials comprise separate first and second windows disposed on the opposing first and second sides, respectively, of the flow channel, and the concave aspheric reflective surface is integrally formed with the second window. In a further embodiment, the first and second materials at least partially define an integral block of material that surrounds the flow channel, and the concave aspheric reflective surface defines a portion of the integral block of material. In such an embodiment, the first and second materials are the same material such that the integral block is a monolithic block of material.

In at least one embodiment, the flow channel is an elongated conduit defining a central axis, and the concave aspheric reflective surface defines an elongated reflector configured to focus and re-collimate the combined beam to and from a region around the central axis of the conduit. In a further embodiment, the flow channel has an interior wall, and at least a portion of the interior wall is reflective and configured to cause the combined beam to pass through the region within the flow channel more than once as to enhance a collection efficiency of the signal collection beam. In a further embodiment, the flow channel includes a spherical chamber defined at least partially by an interior wall, and at least a portion of the interior wall is reflective, causing the combined beam to pass through the region more than once as to enhance a collection efficiency of the signal collection beam.

In at least one embodiment, the flowcell further comprises: a laser operative to generate the laser excitation beam; a spectrograph operative to receive and operate on the signal collection beam; and optical components configured and arranged to combine the laser excitation beam and the signal collection beam into the combined beam.

In yet a further embodiment, the first optical material comprises a window disposed on the first side of the flow channel; the concave aspheric reflective surface is a first-surface mirror comprising the second optical material; and the concave aspheric reflective surface defines the second side of the flow channel opposite the first side. In at least one embodiment, the concave aspheric reflective surface includes a reflective multilayer dielectric coating.

In another aspect of the present disclosure, a Raman analysis system, comprises: a laser source operative to generate a laser excitation beam; a spectrograph operative to receive and operate on a signal collection beam, which includes Raman scattered radiation; a computer configured to receive signals from the spectrograph to analyze Raman signatures present in the signal collection beam; optical components operative and arranged to combine the laser excitation beam and the signal collection beam into a combined counter-propagating, collimated, excitation/collection beam; a flowcell configured to convey a sample, the flowcell including a flow channel therethrough, the flow channel having opposing first and second sides; first and second optical materials disposed on the first and second sides of the flow channel, respectively; and a concave aspheric reflective surface; wherein the collimated excitation/collection combined beam is configured to pass through the first optical material, the flow channel and the second optical material, and then impinge upon the concave aspheric reflective surface; and wherein the concave aspheric reflective surface is operative to focus the laser excitation beam of the combined beam to a region within the sample within the flow channel and to re-collimate the signal collection beam into the combined beam from the region within the flow channel.

BRIEF DESCRIPTION OF THE DRAWINGS

The described embodiments and other features, advantages and disclosures contained herein, and the manner of attaining them, will become apparent and the present disclosure will be better understood by reference to the following description of various embodiments of the present disclosure taken in junction with the accompanying drawings, wherein.

DETAILED DESCRIPTION

The present disclosure is directed to flowcells and Raman spectroscopic analysis systems with improved signal collection dynamics based upon increased solid-angle geometries. The various embodiments of the present disclosure improve numerical aperture while providing varying degrees of signal amplification for near-diffraction-limited performance. Maintaining a diffraction-limited focus is ideal for maximum Raman signal generation capabilities.

Figure 1:
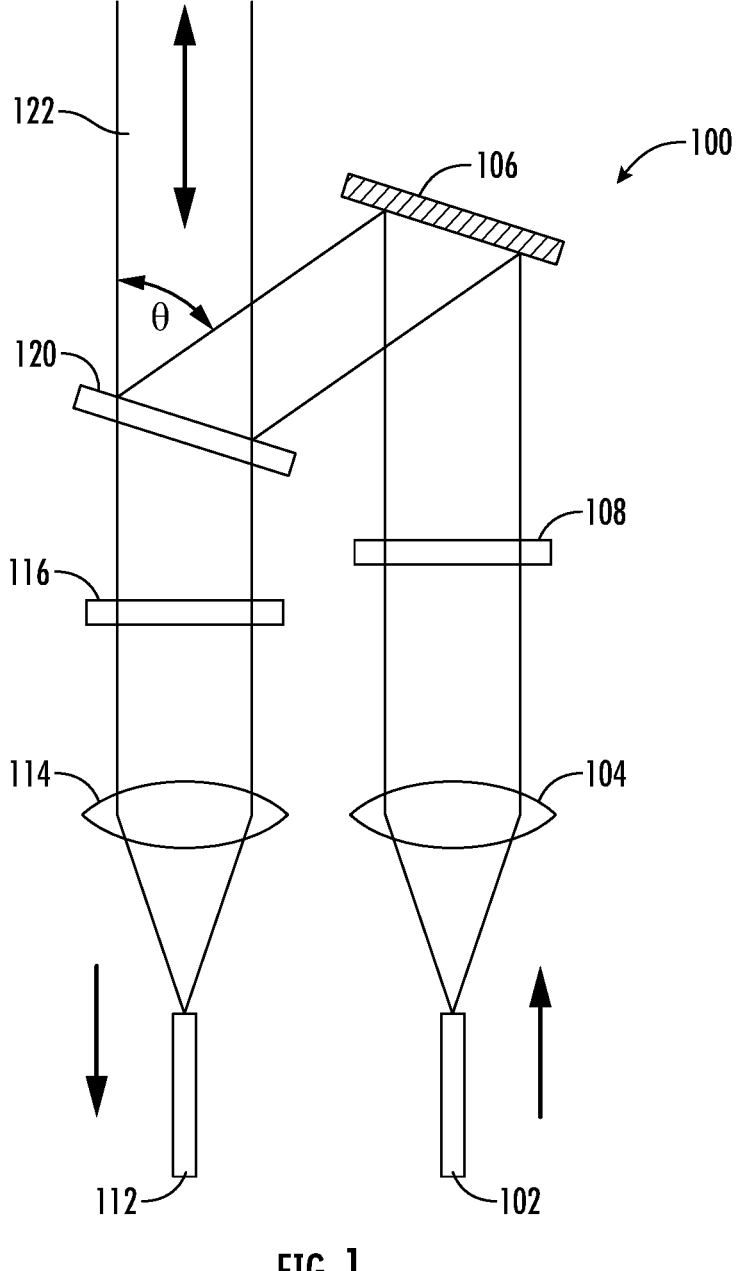
FIG. 1 shows a schematic diagram of a conventional fiber-based Raman probe.

Flowcells and flowcell arrangements constructed according to the present disclosure are generally configured for use with a combined collimated, counter-propagating, laser excitation and signal collection beam to excite and collect Raman scattered radiation (e.g., Raman signal) from a sample (e.g., a fluid sample). The collimated, counter-propagating, excitation/collection combined beam (the "combined beam") may be provided to the flowcell by a suitable arrangement of optical components, including lens, filters, mirrors and fibers, for example, the Raman probe 100 of FIG. 1. However, other probe configurations are applicable and compatible with the flowcells and systems of the present disclosure, including direct-coupled (e.g., non-fiber) configurations.

In embodiments of the present disclosure, a flowcell includes a flow channel configured to convey the sample is defined by first and second opposing walls of first and second optical materials, respectively, disposed on the opposing sides of the channel. The first and second optical materials are at least semi-transmissive to wavelengths of interest (e.g., to the wavelength(s) of the laser excitation source and resulting Raman scattering signal). The first and second optical materials may comprise separate windows disposed on opposing sides of the channel. Alternatively, one or both of the first and second optical materials may integrally (e.g., monolithically) form one or both opposing walls of the channel, thereby defining at least a portion of the flowcell of the present disclosure. In at least one embodiment, the first and second materials are the same material. In all embodiments, the lenses, windows, optical blocks and monolithic blocks may be constructed from any appropriate optical materials, including such non-limiting examples as glass (e.g., leaded glass), crystal (e.g., sapphire), polymer (e.g., polycarbonate, acrylic), etc. The first and second optical materials may be different materials though, in at least one embodiment of the present disclosure, the first and second optical materials are the same material, for example, a single, monolithic material.

In embodiments of the present disclosure, a concave aspheric reflective surface is included, and the combined beam is configured to pass through the first optical material, the flow channel and the second optical material before impinging upon concave aspheric reflective surface, which is configured and operative to focus and re-collimate the combined beam to and from a region of the sample within the flow channel. The concave aspheric reflective surface is configured and operative to focus the excitation beam of the combined beam to a region within the sample within the flow channel and to re-collimate the signal collection beam of the combined beam, which includes the Raman signal, from the region of the sample. In at least one embodiment, the concave aspheric reflective surface is parabolic. In certain embodiments, the concave aspheric reflective surface may a biconic or freeform optical surface.

In embodiments of the present disclosure, the concave aspheric reflective surface may be spaced apart from the second window (e.g., air-spaced), or the concave aspheric reflective surface may be integrally formed with the second window. In alternative embodiments, for example, the first and second optical materials define a monolithic block of material that surrounds and defines the flow channel, and the concave aspheric reflective surface is defined by a portion of the monolithic block of material. The reflective surface may be molded, machined and polished, stamped, cast or manufactured by any suitable process that enables a high-reflectance, optical grade surface. In certain embodiments, the reflective surface may be coated with a reflective coating, for example, a metal or multilayer dielectric coating applied by chemical or physical vapor deposition or other suitable process. The reflective surface may be formed in a glass (e.g., leaded glass), a crystal (e.g., sapphire), a polymer (e.g., polycarbonate, acrylic) or a metal (e.g., aluminum, gold, beryllium).

According to the present disclosure, a region within the flow channel and/or the sample in which the combined beam is focused (e.g., the focused region) may approximate a point or a line. Thus, the flow channel may be an elongated conduit defining a central axis, and the concave aspheric reflective surface may define an elongated reflector configured to focus and re-collimate the combined beam to and from the focused region around the central axis of the channel. In certain embodiments, at least a portion of an interior wall of the channel may be reflective, configured and operative to cause the combined beam to pass through the focused region more than once to enhance the collection efficiency of the flowcell of the present disclosure.

According to at least one embodiment of the present disclosure, a Raman system includes: the flowcell of the present disclosure; a laser excitation source configured to generate a laser excitation beam of a desired wavelength; optical components selected, configured and arranged to combine the laser excitation beam and the signal collection beam into the combined beam; a spectrograph configured to receive the collection beam of the combined beam; and a programmable computer to receive and operate upon signals from the spectrograph to output a Raman spectroscopic analysis (e.g., Raman spectra) to an operator.

Figure 2:
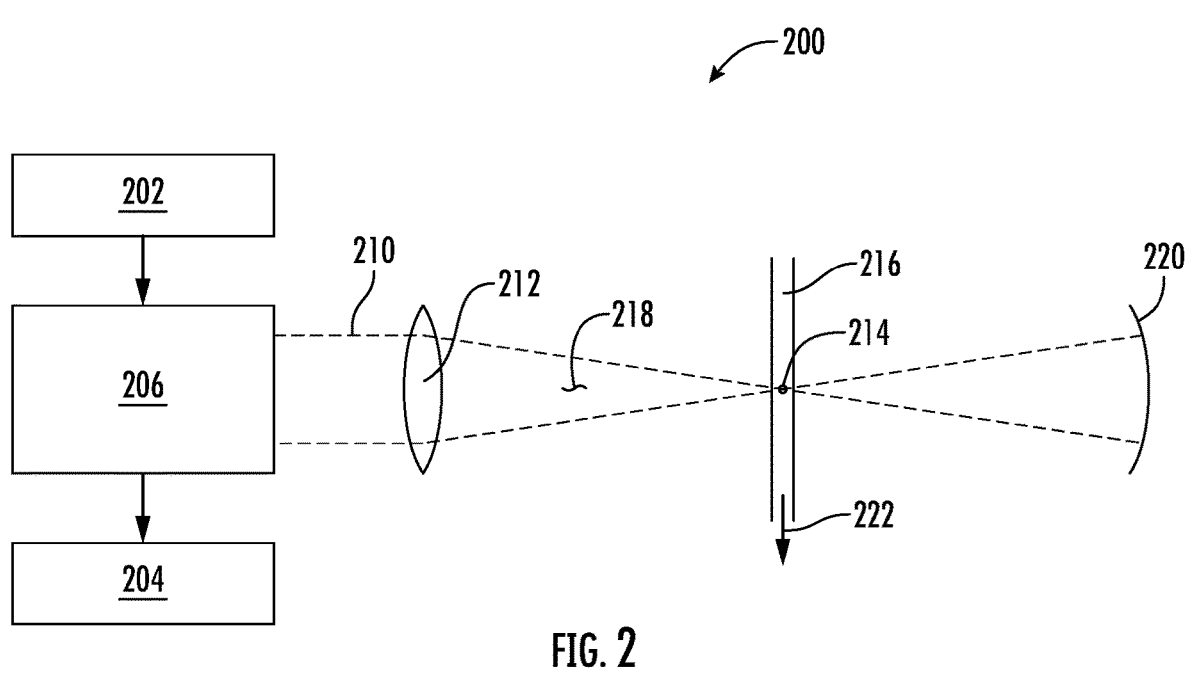
FIG. 2 shows a simplified block diagram of a conventional Raman flowcell arrangement.
Figures 3, 4:
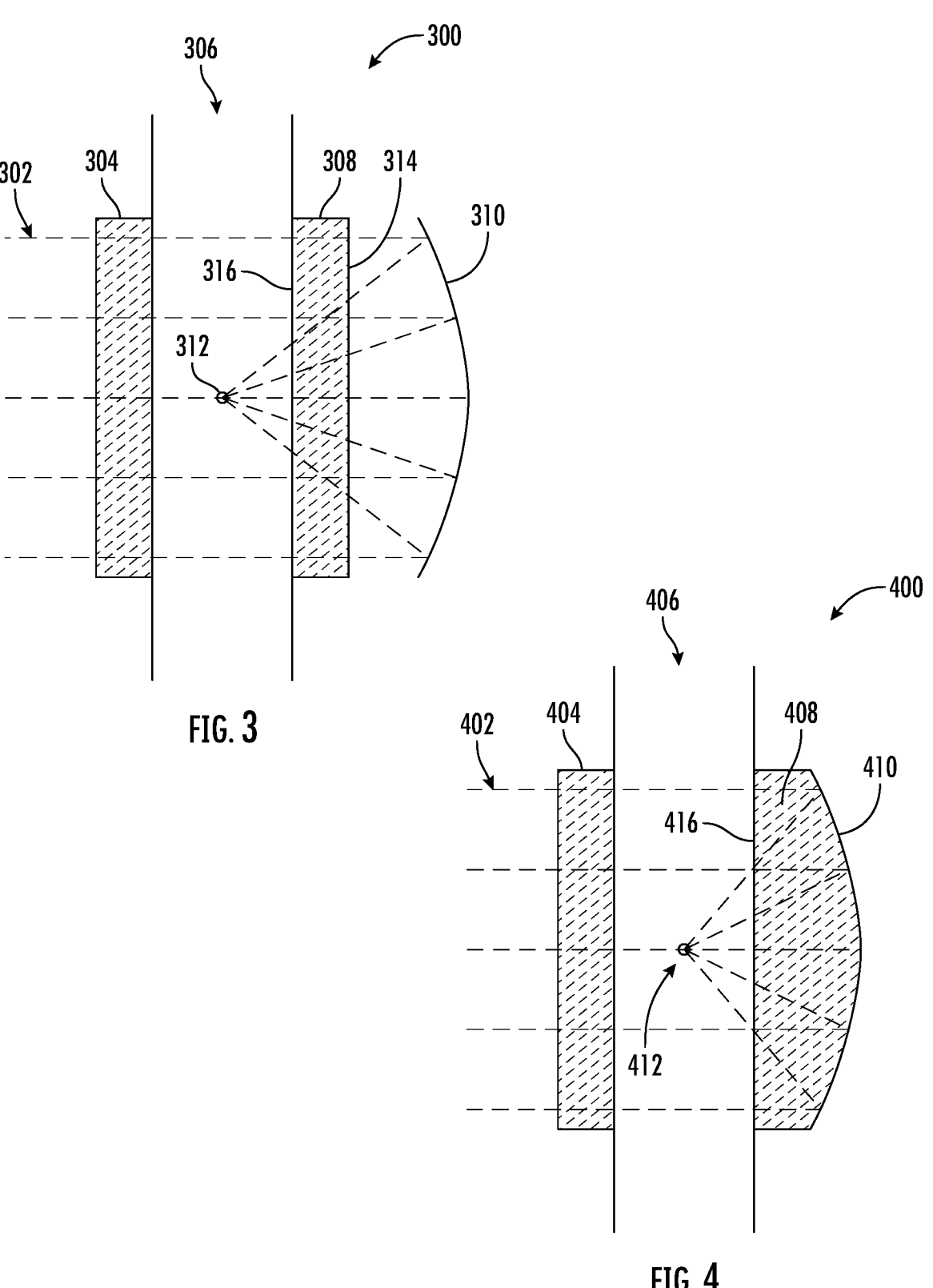
FIG. 3 illustrates an embodiment of the present disclosure using an air-spaced aspheric reflector.
FIG. 4 depicts an embodiment of the present disclosure that avoids air spacing, thereby achieving a pass-through objective that is index-matched.

An exemplary embodiment of a flowcell 300 according to the present disclosure is illustrated in FIG. 3. The flowcell 300 includes a flow channel 306 defined therein, which contains a sample. In certain embodiments, the sample (e.g., a liquid sample) flows through the flow channel 306 defined within the flowcell 300. The flowcell 300 includes an air-spaced, concave aspheric reflective surface 310, which in at least one embodiment may be a mirror. A collimated, counter-propagating, laser excitation and signal collection combined beam 302 passes through the flow channel 306 in collimated space. The combined beam 302 (e.g., an excitation beam of the combined beam 302) passes through a first window 304 on one side of a flow channel 306, through the flow channel 306 and then through a second window 308 on the opposing side of the flow channel 306 before impinging upon the reflective surface 310, which focuses the combined beam 302 into the sample at a focus 312. A collection signal, which includes a Raman signal resulting from Raman scattering from the sample, is then re-collimated by the reflective surface 310 and transmitting to a spectrograph (e.g., the spectrometer 204 of FIG. 2) via the path of the counter-propagating combined beam 302.

Notably, in the embodiment of FIG. 3, the windows 304, 308, which at least partially define the flow channel 306 have parallel sides, normal to the collimated, combined beam 302 to minimize diffraction. The flow channel 306 may be a portion of a process line (e.g., tube, pipe, channel) or of a sample line feed by a process line, which portion includes the windows 304, 308. While the flowcell 300 improves numerical aperture and likely generates a degree of signal amplification, aberrations due to index-mismatch between the collimated, combined beam 302 and surfaces 314, 316 of the window 308 reduce effective signal-generation/collection dynamics of the flowcell 300.

In certain embodiments, the concave aspheric reflective surface 310 is parabolic. However, in alternative embodiments, a departure from a true parabolic surface is advantageous due to interfaces encountered by the focused beam and by collimation of the collection signal. For example, in the embodiment of the flowcell 300 as shown in FIG. 3, because the reflective surface 310 is air-spaced, the combined beam 302 must pass through surfaces 314, 316 of window 308, whereby focusing at focus 312 may benefit from a concave aspheric surface that is more complex to account for the aberration resulting from interfaces at surfaces 314, 316. When the sample medium is a liquid, the interface at surface 316 is fluid/window, whereas the interface at surface 314 is air/window. In certain embodiments, the reflective surface 310 may be a biconic or freeform optical surface configured to compensate for such aberrations. In at least one embodiment, a liquid may be selected and introduced in the space between the reflective surface 310 and surface 314 to improve index-matching.

According to a further embodiment of the present disclosure as shown in FIG. 4, a flowcell 400 eliminates air spacing between a wall or window of a flow channel 406 within the flowcell 400 and a concave aspheric reflective surface 410, thereby providing a pass-through, aspheric objective that is index-matched. In such an embodiment, a combined beam 402 (e.g., an excitation beam of the combined beam 402) passes through flow channel 406 in collimated space, passing through a window 404 and then entering a block 408, which integrates an opposing flowcell window (e.g., at least partially defining the flow channel 406) and the reflective surface 410 in a single component, in which the reflective surface 410 is defined on a side of the block 408 opposite the flow channel 406. In certain embodiments, the combined window/reflector block 408 may be index-matched with the sample at the surface 416 (e.g., based on the composition of the sample). In such an embodiment, the block 408 may be constructed from a high-index material to enable improved index-matching.

The configuration of the flowcell 400 improves numerical aperture (>1.0 in sample) with a potential amplification of up to 13× even without optimization. The flowcell 400 maintains near-diffraction-limited performance with a smaller focus 412 and improved signal-collection dynamics relative to conventional flowcells, such as the flowcell arrangement of FIG. 2.

Figures 5, 6:
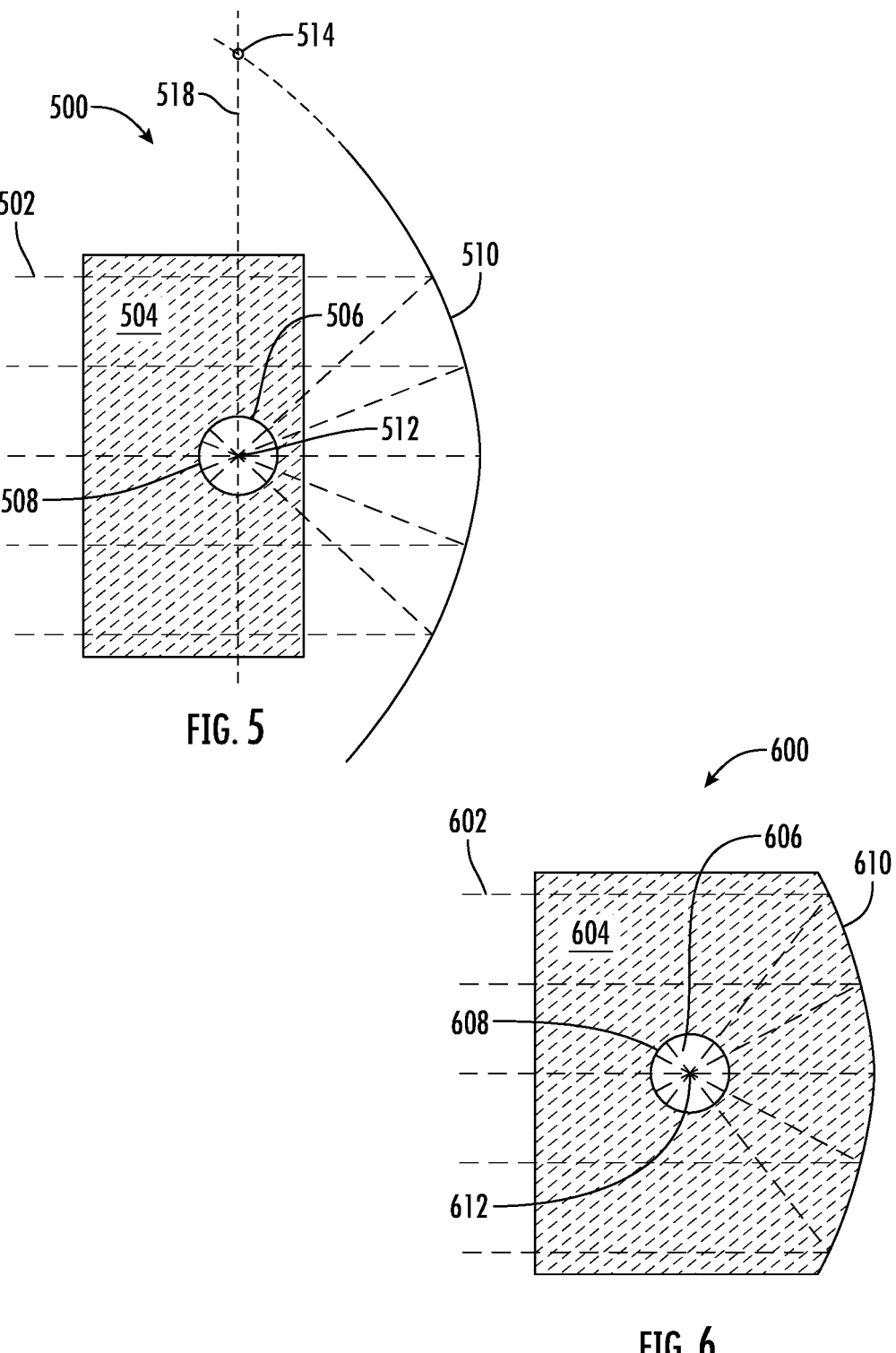
FIG. 5 shows a further embodiment of the present disclosure involving a pass-through, monolithic reflector with a capillary flowcell.
FIG. 6 illustrates yet a further embodiment of the present disclosure incorporating a monolithic block, including a molded or machined reflective surface.

According to a further embodiment of the present disclosure as shown in FIG. 5, a flowcell 500 includes a pass-through, monolithic, concave aspheric reflector 504 with a flow channel 506. In such an embodiment, a combined excitation/collection beam 502 enters the monolithic block 504 in which the flow channel 506 is defined and oriented substantially normal to the combined beam 502. The combined beam 502 (e.g., an excitation beam of the combined beam 502) passes through the flow channel 506 in collimated space and continues through a bulk portion of the block 504, exiting the block 504 before impinging on an aspheric reflective surface 510, which focuses the beam 502 to focus 512 (e.g., a point, line or region) in the flow channel 506. In an embodiment, the focus 512 may be at a longitudinal axis (e.g., in/out of the plane of the cross-section of FIG. 5) of the flow channel 506 such that the focused beam reflects off an inner surface 508 of the flow channel 506 as to generate additional amplification. In certain embodiments, the inner surface 508 may include a reflective coating, for example, a metallized. In at least one embodiment, the flow channel 506 may be a capillary having a cross-sectional flow area much smaller than conventional flow channels generally used in flowcells for spectroscopy and smaller than the flow channels 306, 406 of the flowcells 300, 400, respectively.

The reflective surface 510 may wrap around beyond 180 degrees (e.g., beyond an intersection 514 of the reflective surface 510 and a radial axis 518, as shown in FIG. 5) to enable further improved signal collection dynamics. The flowcell 500 enables substantially improved numerical aperture with nearly unlimited potential relative to conventional flowcells. The flowcell 500 maintains near-diffraction-limited performance along one axis (e.g., the axis of the combined beam 502) with minor aberrations parallel to the flow channel 506 and slight losses due to aberration. Correction of such aberrations along the longitudinal axis of the flow channel 506 may be effected by embodiments in which the reflective surface 510 is a biconic or freeform optical surface optimized to compensate for aberrations present at a boundary layer of the flow channel 506. In such an embodiment, the biconic or freeform surface of the reflective surface 510 is operative for all monolithic, cylindrical flow channel configurations and provides for an ideal solution independent of a spherical amplifier channel. Such aberrations are more pronounced in embodiments in which the flow channel 506 has a cylindrical geometry, as opposed to planar cases such as flowcells 300, 400 of FIGS. 3 and 4.

According to a further embodiment of the present disclosure as shown in FIG. 6, a flowcell 600 includes a monolithic block 604, which includes a molded or machined and polished concave aspheric reflective surface 610. The flowcell 600 further includes a flow channel 606 defined therethrough, in which the sample medium flows in a direction normal to a combined collimated excitation/collection beam 602. As in the flowcell 500 of FIG. 5, the flow channel 606 may a capillary much smaller than conventional flowcell flow channels. The block 604 may be configured such that a focus 612 of the flowcell 600 is on an axis extending along a channel centerline of the flow channel 606 at a point or along a line. The block 604 may include a mirrored or reflective surface 608 (e.g., coated) configured to generate a retro-reflection of the combined beam 602, enabling additional signal amplification of up to approximately 2×.

As shown in FIG. 6, in the flowcell 600, the combined beam 602 (e.g., an excitation beam of the combined beam 602) passes through the flow channel 606 in collimated space, enters a bulk portion of the block 604, reflects off the reflective surface 610 and enters the flow channel 606, focused at the focus 612. In such an embodiment, the numerical aperture is substantially improved relative to conventional flowcells with almost unlimited potential. Such an embodiment maintains near-diffraction-limited performance along one axis (e.g., the axis of the combined beam 602), with minor aberrations parallel to the flow channel 606 and slight losses due to aberration. Such aberration may be minimized in embodiments incorporating a biconic or freeform optical solution at the reflective surface 610.

Figure 7:
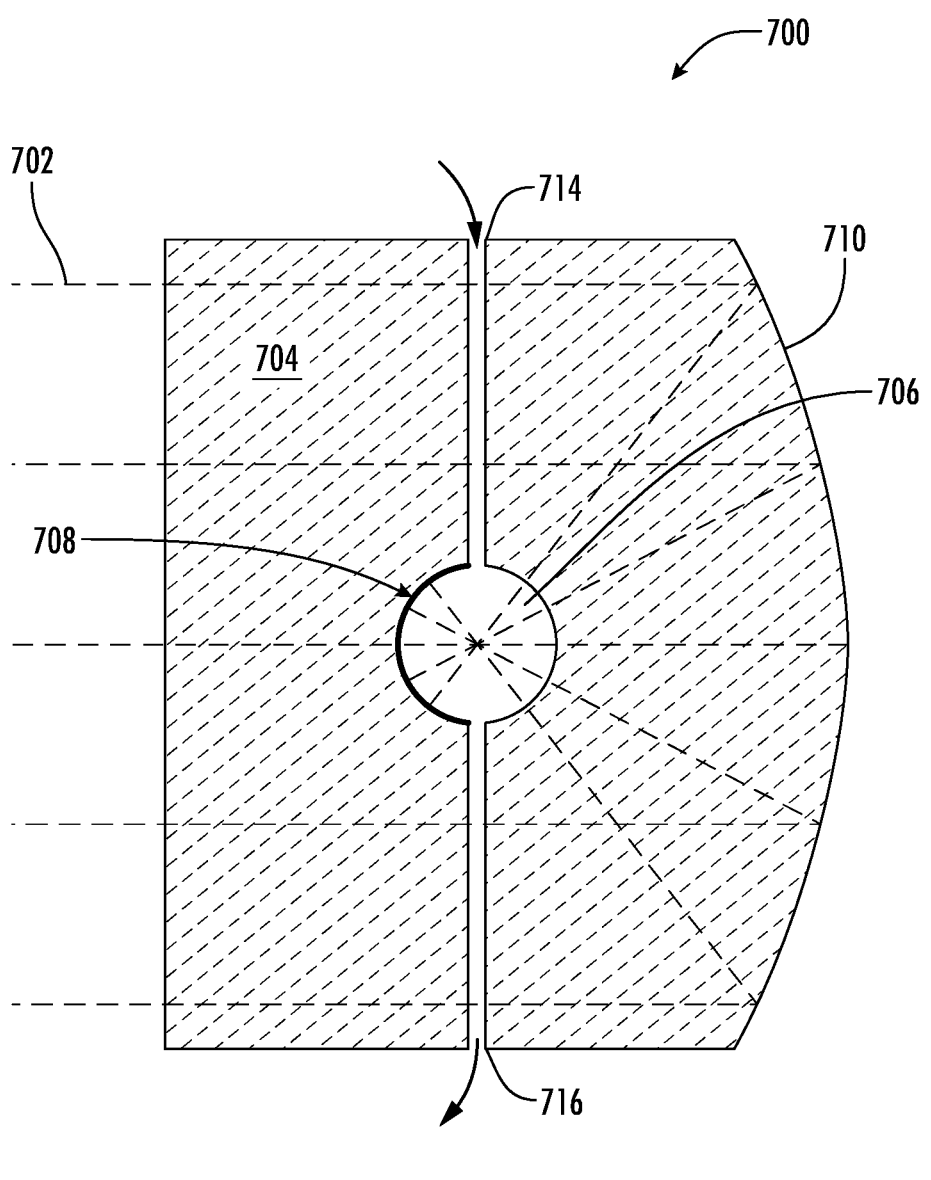
FIG. 7 illustrates yet a further embodiment of the present disclosure, wherein a flow channel is configured as a spherical amplifier with an inner reflective surface fed by small inlet/outlet capillaries.

According to a further embodiment of the present disclosure as shown in FIG. 7, a flowcell 700 includes a flow channel that includes a spherical chamber 706, which may be configured as a spherical amplifier, in a block 704. In at least one embodiment, the spherical chamber 706 is fed with the sample via a small inlet capillary 714, and the sample is discharged from the flow channel 706 via an outlet capillary 716, such that the sample (e.g., liquid) flows through the spherical chamber 706. In FIG. 7, the inlet/outlet capillaries 714, 716 are depicted as on-axis, opposing capillaries that are normal to the path of the combined beam 702. In alternative embodiments, any suitable inlet/outlet configuration may be used, including inlet/outlet capillaries oriented at an angle relative to each other or adjacent to each other at any angle relative to the spherical chamber 706.

As shown in FIG. 7, a combined collimated excitation/collection beam 702 (e.g., an excitation beam of the combined beam 702) passes through the spherical chamber 706 in collimated space, enters a bulk portion of the block 704, reflects off a concave aspheric reflective surface 710 defined by the block 704 and into the spherical chamber 706. In certain embodiments, at least one half of the spherical chamber 706 (e.g., a hemisphere) may include a reflective surface 708, providing an additional amplification potential (e.g., up to 4×) with slight losses due to aberration. The flowcell 700 enables substantially improved numerical aperture with near-diffraction-limited performance along both axes—e.g., parallel and normal to the combined beam 702.

Figure 8:
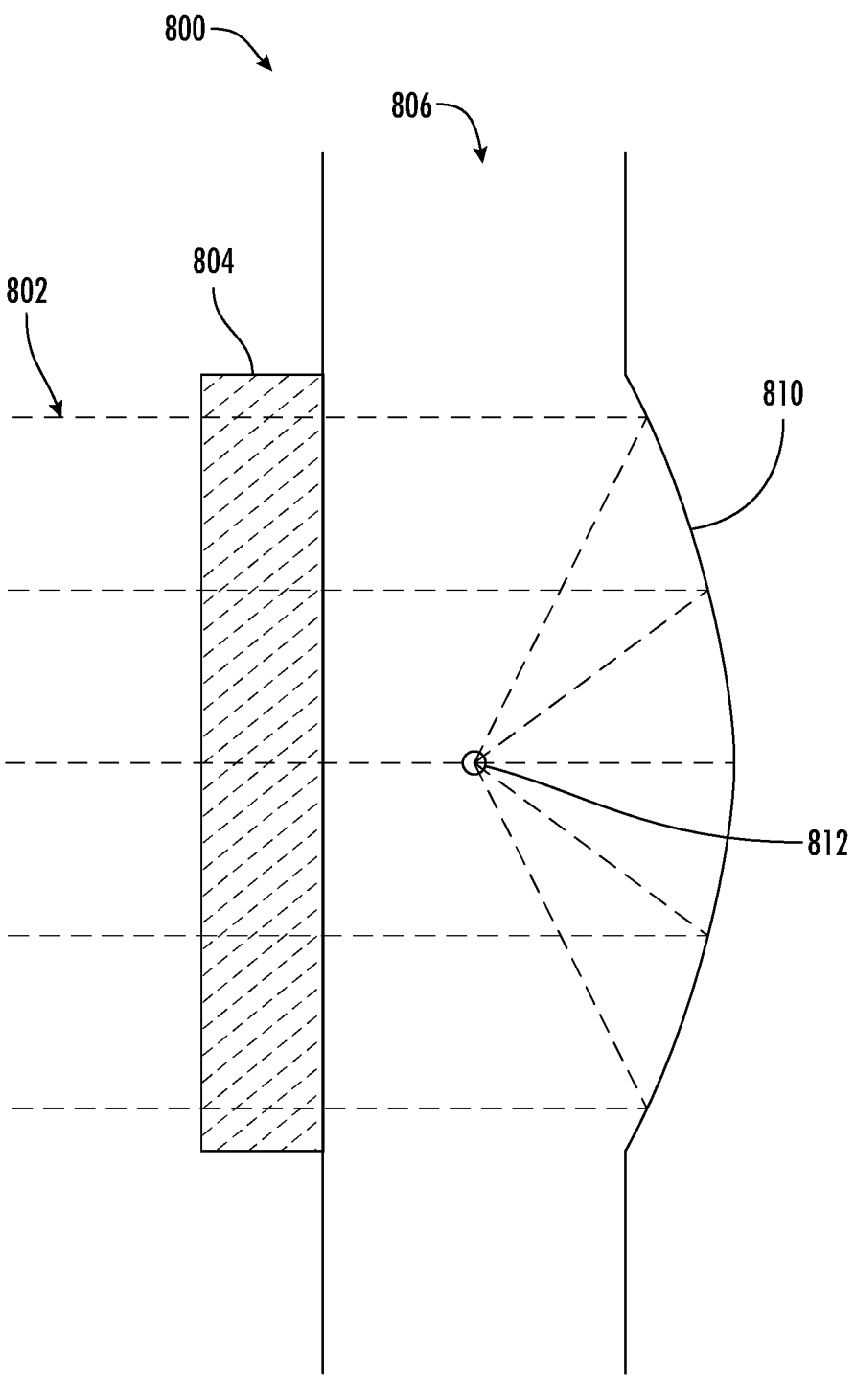
FIG. 8 illustrates a further embodiment of the present disclosure with an integral aspheric reflector.

According to a further embodiment of the present disclosure as shown in FIG. 8, a flowcell 800 includes a flow channel 806 is defined by a flat window 804 (e.g., plate having parallel opposing sides normal to the combined beam) on one side of the flow channel 806 and a concave aspheric reflective surface 810 on an opposing side of the flow channel 806. The reflective surface 810 is integrated with the flow channel 806 such that the reflective surface 810 defines a portion of a wall of the flow channel 806 opposite the window 804. In such an embodiment, the sample flowing through flow channel 806 fills the entire volume between the window 804 and the reflective surface 310, thereby avoiding any index-matching concerns between the sample and an optical material defining the flow channel 806 wall. In certain embodiments, the reflective surface 810 may be integrated with the flow channel 806 by assembly. For example, the reflective surface 810 may include or may be connected to a portion of a wall of the flow channel 806 adjacent the reflective surface 810.

A collimated, counter-propagating, laser excitation and signal collection combined beam 802 passes through the flow channel 806 in collimated space. The combined beam 802 passes through the window 804 on one side of the flow channel 806, through the flow channel 806, and then impinges on the reflective surface 810, which focuses the combined beam 802 into the sample at a focus 812. A collection signal, which includes a Raman signal resulting from Raman scattering from the sample, is then re-collimated by the reflective surface 810 and transmitting to a spectrograph via the path of the counter-propagating combined beam 802.

In at least one embodiment, the reflective surface 810 is a first-surface mirror. In such embodiments, the reflective surface 810 may be formed on a first surface of, for example, a molded, machined, stamped or cast substrate and polished. As a non-limiting example, the reflective surface 810 may be coated with a reflective coating, for example, a metal or multilayer dielectric coating applied by chemical or physical vapor deposition or other suitable process. In alternative embodiments, the reflective surface 810 may a highly polished (e.g., optical grade) surface of the substrate without a reflective coating. In such an embodiment, the substrate material is selected to be compatible with the sample medium. In certain embodiments, the reflective surface 810 is a parabolic, biconic or freeform optical surface.

While various embodiments of a flowcell and methods for using and constructing the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure. The present disclosure is not intended to be exhaustive or to limit the scope of the subject matter of the disclosure.

We claim:

1. A flowcell for spectroscopy for use with a collimated optical beam combining a laser excitation beam and a signal collection beam into a combined beam, the flowcell comprising:
   a flow channel configured to convey a sample, wherein the flow channel has opposing first and second sides, and a longitudinal axis defining a flow direction;
   first and second optical materials disposed on the first and second sides of the flow channel, respectively; and
   a single concave aspheric reflective surface disposed adjacent the second side, wherein the concave aspheric reflective surface is a parabolic, biconic, or freeform optical surface,
   wherein the collimated beam is configured relative to the flowcell to pass through the first optical material, intersect the flow channel at a substantially transverse angle, pass through the second optical material, and then impinge upon the concave aspheric reflective surface,
   wherein the concave aspheric reflective surface is configured to focus the excitation beam of the combined beam to a region within the sample within the flow channel and to re-collimate the signal collection beam into the combined beam from the region within the sample, and
   wherein the signal collection beam includes Raman scattered radiation.

2. The flowcell of claim 1, wherein the concave aspheric reflective surface is a biconic optical surface.

3. The flowcell of claim 1, wherein the first and second optical materials each comprise separate windows disposed on the opposing first and second sides of the flow channel.

4. The flowcell of claim 1, wherein the first and second optical materials form the opposing first and second sides of the flow channel, respectively.

5. The flowcell of claim 1, wherein:
   the first and second optical materials comprise separate first and second windows disposed on the opposing first and second sides, respectively, of the flow channel; and
   the concave aspheric reflective surface is spaced apart from the second window.

6. The flowcell of claim 1, wherein:
   the first and second optical materials comprise separate first and second windows disposed on the opposing first and second sides, respectively, of the flow channel; and
   the concave aspheric reflective surface is integrally formed with the second window.

7. The flowcell of claim 1, wherein:
   the first and second optical materials at least partially define an integral block of material that surrounds the flow channel; and
   the concave aspheric reflective surface defines a portion of the integral block of material.

8. The flowcell of claim 7, wherein the first and second optical materials are the same material such that the integral block is a monolithic block of material.

9. The flowcell of claim 1, wherein:
   the flow channel is an elongated conduit defining a central axis; and
   the concave aspheric reflective surface defines an elongated reflector configured to focus and re-collimate the combined beam to and from a region around the central axis of the conduit.

10. The flowcell of claim 1, wherein:
   the flow channel has an interior wall; and
   at least a portion of the interior wall is reflective and configured to cause the combined beam to pass through the region within the flow channel more than once as to enhance a collection efficiency of the signal collection beam.

11. The flowcell of claim 1, wherein:
   the flow channel includes a spherical chamber defined at least partially by an interior wall; and
   at least a portion of the interior wall is reflective, causing the combined beam to pass through the region more than once as to enhance a collection efficiency of the signal collection beam.

12. The flowcell of claim 1, further comprising:
   a laser operative to generate the laser excitation beam;
   a spectrograph operative to receive and operate on the signal collection beam; and
   optical components configured and arranged to combine the laser excitation beam and the signal collection beam into the combined beam.

13. The flowcell of claim 1, wherein:
   the first optical material comprises a window disposed on the first side of the flow channel;
   the concave aspheric reflective surface is a first-surface mirror comprising the second optical material; and
   the concave aspheric reflective surface defines the second side of the flow channel opposite the first side.

14. The flowcell of claim 1, wherein the concave aspheric reflective surface includes a reflective multilayer dielectric coating.

15. A Raman analysis system, comprising:

a laser source operative to generate a laser excitation beam;

a spectrograph operative to receive and operate on a signal collection beam, which includes Raman scattered radiation;

a computer configured to receive signals from the spectrograph to analyze Raman signatures present in the signal collection beam;

optical components operative and arranged to combine the laser excitation beam and the signal collection beam into a combined counter-propagating, collimated, excitation/collection beam;

a flowcell configured to convey a sample, the flowcell including a flow channel therethrough, the flow channel having opposing first and second sides, and a longitudinal axis defining a flow direction;

first and second optical materials disposed on the first and second sides of the flow channel, respectively; and a single concave aspheric reflective surface, wherein the concave aspheric reflective surface is a parabolic, biconic, or freeform optical surface;

wherein the collimated excitation/collection combined beam is configured to pass through the first optical material, intersect the flow channel at a substantially transverse angle, pass through the second optical material, and then impinge upon the concave aspheric reflective surface; and wherein the concave aspheric reflective surface is configured to focus the laser excitation beam of the combined beam to a region within the sample within the flow channel and to re-collimate the signal collection beam into the combined beam from the region within the flow channel.

16. The system of claim 15, wherein the concave aspheric reflective surface is a biconic optical surface.

17. The system of claim 15, wherein:

the first and second optical materials comprise separate first and second windows disposed on opposing first and second sides of the flow channel, respectively; and the concave aspheric reflective surface is integral with the second window.

18. The system of claim 15, wherein:

the first and second optical materials form a monolithic block of material that surrounds the flow channel; and the concave aspheric reflective surface defines a portion of the monolithic block.

19. The system of claim 15, wherein:

the flow channel is an elongated conduit defining a central axis; and the concave aspheric reflective surface defines an elongated reflector configured to focus and re-collimate the combined beam to and from a region around the central axis of the conduit.

20. The system of claim 15, wherein:

the flow channel includes an interior wall; and at least a portion of the interior wall is reflective, causing the combined beam to pass through the region within the sample more than once as to enhance a collection efficiency of the signal collection beam.

21. The system of claim 15, wherein:

the flow channel includes a spherical chamber including an interior wall; and at least a portion of the interior wall is reflective, causing the combined beam to pass through the region within the sample more than once as to enhance a collection efficiency of the signal collection beam.

22. The flowcell of claim 1, wherein a refractive index of the second optical material matches a refractive index of the sample.

\* \* \* \* \*